United States Patent [19]
Thompson

[11] Patent Number: 6,107,989
[45] Date of Patent: *Aug. 22, 2000

[54] ADAPTIVE CURSOR FOR INTERPRETING DISPLAYS OF GROUPED DATA WORDS

[75] Inventor: William Thompson, Beaverton, Oreg.

[73] Assignee: Tektronix, Inc., Beaverton, Oreg.

[*] Notice: Under 35 U.S.C. 154(b), the term of this patent shall be extended for 1323 days.

[21] Appl. No.: 08/512,072

[22] Filed: Aug. 7, 1995

Related U.S. Application Data

[63] Continuation of application No. 08/276,753, Jul. 18, 1994, abandoned, which is a continuation of application No. 08/065,337, May 24, 1993, abandoned.

[51] Int. Cl.[7] ............................................. G09G 5/08
[52] U.S. Cl. ................................... 345/157; 382/311
[58] Field of Search ................................. 345/156, 157, 345/162, 116, 133, 141, 145, 123; 371/29.1, 22.1, 16.5; 395/146, 144, 145; 382/309, 310, 311

[56] References Cited

U.S. PATENT DOCUMENTS

| | | | |
|---|---|---|---|
| 4,066,880 | 1/1978 | Salley | 371/29.1 |
| 4,393,498 | 7/1983 | Jackson et al. | 371/29.1 |
| 4,747,058 | 5/1988 | Ho | 364/478 |
| 5,020,011 | 5/1991 | Stark et al. | 371/29.1 |
| 5,339,391 | 8/1994 | Wroblenski et al. | 345/123 |

*Primary Examiner*—Chanh Nguyen
*Attorney, Agent, or Firm*—Francis I. Gray

[57] ABSTRACT

An adaptive cursor for interpreting displays of grouped data words highlights all of the bits of a segment associated with the bit position of the cursor. The grouped data words are extracted as an ancillary block from a serial digital input signal block. The format for the grouped data words is stored in a programmable read only memory (PROM). A microprocessor accesses the PROM according to the bit position of the cursor to determine the bits that make up the segment, and causes the segment to be highlighted. The microprocessor also decodes the segment to provide a corresponding alphanumeric display.

4 Claims, 4 Drawing Sheets

```
    30   ,--32
    (   /
1 1 [1 1 1] 1 1 1     1 0 0 0 0 0 0 0
1 0 1 0 1 0 1 0       0 1 0 1 0 1 0 0
0 1 0 1 0 1 1 1       0 0 0 0 1 1 1 1
0 0 1 1 0 0 1 1       1 1 1 0 0 0 1 0
0 1 1 1 0 0 1 1       0 1 1 1 1 1 1 1
0 0 0 0 0 0 0 0       1 1 1 1 1 1 1 1
1 1 1 1 1 1 1 1       1 1 1 1 1 1 1 1
0 1 1 1 0 0 0 0       0 0 0 0 0 0 0 0
1 1 0 0 0 0 0 0       0 0 0 1 1 1 1 1
0 1 0 1 0 1 0 1       0 1 0 1 0 1 0 1
1 1 0 0 1 1 0 0       0 0 1 1 0 0 1 1
1 0 1 0 1 0 1 0       0 0 0 0 0 0 0 0
```

|   | BYTE X | BYTE X+1 |
|---|--------|----------|
| X=0  | 11111111 | 10000000 |
| X=2  | 10101010 | 01010100 |
| X=4  | 01010111 | 00001111 |
| X=6  | 00110011 | 11100010 |
| X=8  | 01110011 | 01111111 |
| X=10 | 00000000 | 11111111 |
| X=12 | 11111111 | 11111111 |
| X=14 | 01110000 | 00000000 |
| X=16 | 11000000 | 00011111 |
| X=18 | 01010101 | 01010101 |
| X=20 | 11001100 | 00110011 |
| X=22 | 10101010 | 00000000 |

ADAPTIVE CURSOR FOR INTERPRETING DISPLAYS OF GROUPED DATA WORDS

This is a continuation of application Ser. No. 08/276,753, filed Jul. 18, 1994 and now abandoned, which is a continuation of application Ser. No. 08/065,337, filed May 24, 1993 and now abandoned.

BACKGROUND OF THE INVENTION

The present invention relates to binary data displays, and more particularly to an adaptive cursor for interpreting displays of grouped data segments within unformatted groups of data bits.

When unformatted groups of data bits appear on the display of a computer, analysis device or measurement instrument, it is difficult to determine the locations of boundaries between contiguous segments of data bits. This problem is compounded when the length or size of segments is not uniform and when the positions of bits are scrambled. One example of an unformatted group of data bits is digital audio data in the AES/EBU format. This data and associated clocking information is transmitted in serial format using a Manchester code with bi-phase mark coding rules. The important signal characteristics are: the signal has no d.c. content; decoding information is contained in transitions, i.e., changes in amplitude; no polarity information is required; and the clock signal is embedded within the data. A typical Manchester Code serial data signal is shown in FIG. 1 in the time domain.

The data represented by the signal of FIG. I may be organized into blocks of data. Special characters, called PREambles, delimit the boundaries of these blocks. These blocks may have the time domain structure as shown in FIG. 2. In this case the PREambles permit the identification of the points in time where the portions of the block, labeled "S", "A" and "B", begin. Blocks may be subdivided into smaller portions called Frames, which in turn may be subdivided into two subframes, "A" and "B". The structure of an AES/EBU subframe is shown in FIG. 3. The subframe has 32 bits of data. The first four bits are the PREamble characters, the next 24 bits carry audio sample information in a PCM format, and the last four bits provide special information including audio sample Validity, User data, Channel status data and subframe Parity. Receiving/decoding devices need to assemble the individual Channel and User data from the "S", "A" and "B" subframes into blocks of data according to the schematic diagram shown in FIG. 4. Thus from the serial data block four unique ancillary blocks of data are constructed having the following characteristics: block information is temporal in nature with "buildup" of the blocks being related to the inverse of the Frame repetition rate, i.e., for blocks of N bits and a frame rate of X frames per second it takes N/X seconds to accumulate a complete ancillary block; and as soon as one set of blocks is completed the accumulation of another set of blocks is started. The AES/EBU, IEC 958 and SPDIF Digital Audio Data Signals employ this Manchester encoding and Block data, and define different formats for the usage of the bits making up the four ancillary blocks.

For digital audio applications the ancillary block size is 192 bits, with each block being organized into 24 8-bit bytes. Graphically a block may have the appearance as shown in FIG. 5 in binary form. As an example of one of these formats, the AES/EBU Channel Status Format:

Byte 0
   bit 0=professional/consumer
   bit 1=audio/nonaudio data
   bits 2–4=type of emphasis
   bit 5=sampling frequency locked
   bits 6–7=sampling rate
Byte 1 Channel mode, user bit management
Byte 2 Use of auxiliary bits, word length, encode history
Byte 3 Future description
Byte 4 Digital audio reference signal, reserved
Byte 5 Reserved
Bytes 6–9 Alphanumeric origin data
Bytes 10–13 Alphanumeric destination data
Bytes 14–17 Local sample address code
Bytes 18–21 Time of day sample address code
Byte 22 Reliability of preceding bits
Byte 23 CRCC character Similar definitions exist for the other blocks and the other formats. These formats will continue to evolve with new assignments for the bits and new applications being developed.

It is difficult to examine the individual bit representations of the data and be able to decode the meaning of the bit positions and states and detect errors in certain bits. The meaning of the groups or segments of bits depends upon their location within the block and often the states of preceding bit positions.

What is desired is an adaptive cursor that automatically adjusts its indication to identify all bits of a segment of data bits whenever it is pointed to at least one bit of the segment to easily identify the segment.

SUMMARY OF THE INVENTION

Accordingly the present invention provides an adaptive cursor for interpreting displays of grouped data elements when unformatted groups of data elements appear on a display. The block bits from a serial data input signal are extracted and stored in a memory to build up an ancillary block of data. The format of the ancillary block of data is stored in a programmable read only memory (PROM) with certain bits of the ancillary block serving as a pointer to the proper format within the PROM. When an operator moves a cursor to a particular position within a binary display of the ancillary block, a microprocessor accesses the PROM to determine whether the particular bit at the particular position has bits associated with it to form a segment. The microprocessor causes the associated bits also to be highlighted and decodes the segment to provide an alphanumeric display as well. Therefore at each cursor position the microprocessor causes one or more bits of the binary display to be highlighted according to the segment within which the cursor is positioned.

The objects, advantages and other novel features of the present invention are apparent from the following detailed description when read in conjunction with the appended claims and attached drawing.

DESCRIPTION OF THE PREFERRED EMBODIMENT

Figure 1:
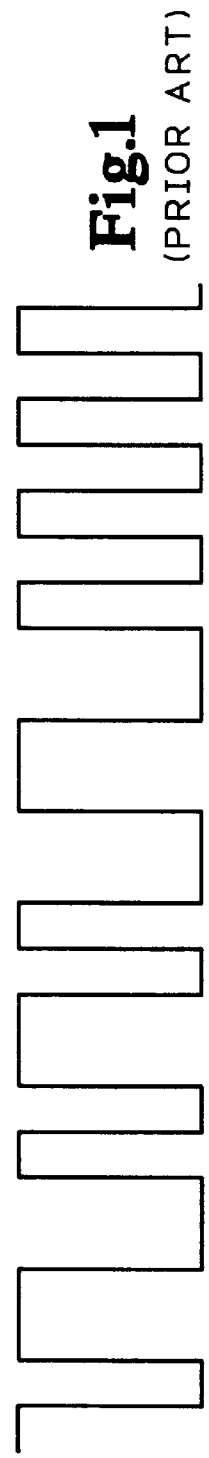
FIG. 1 is an illustration of a Manchester encoded serial digital signal.
Figure 2:
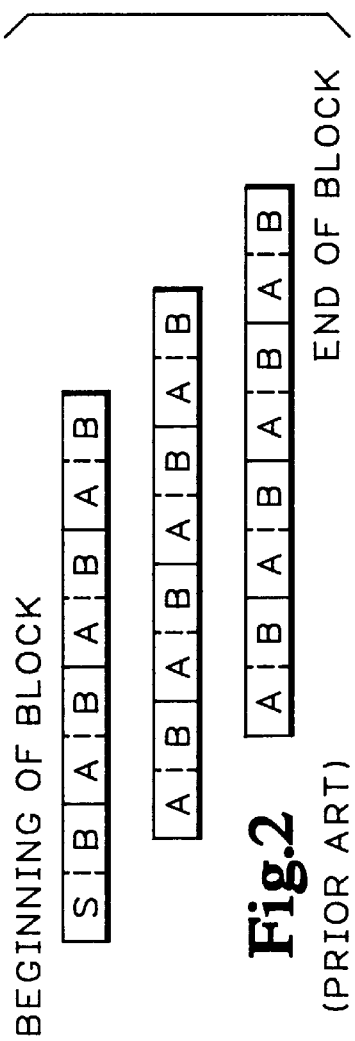
FIG. 2 is an illustration of a serial data block including frames and subframes for specified digital formats.
Figure 3:
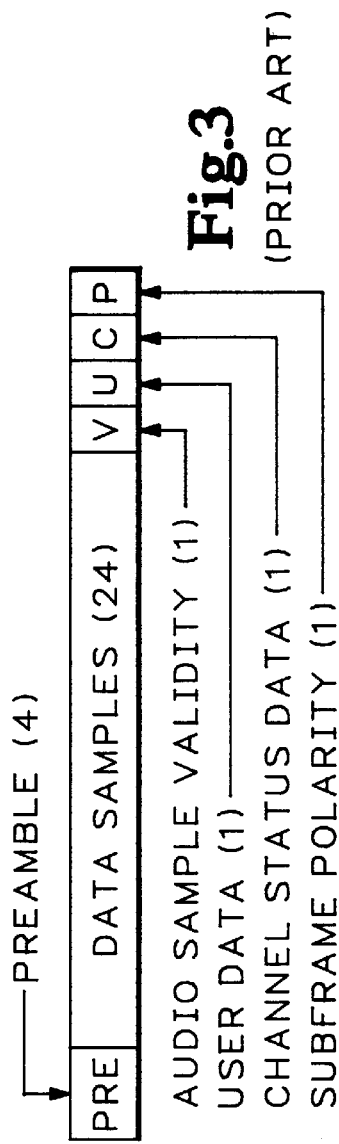
FIG. 3 is an illustration of a subframe of the serial data block of FIG. 2.
Figure 4:
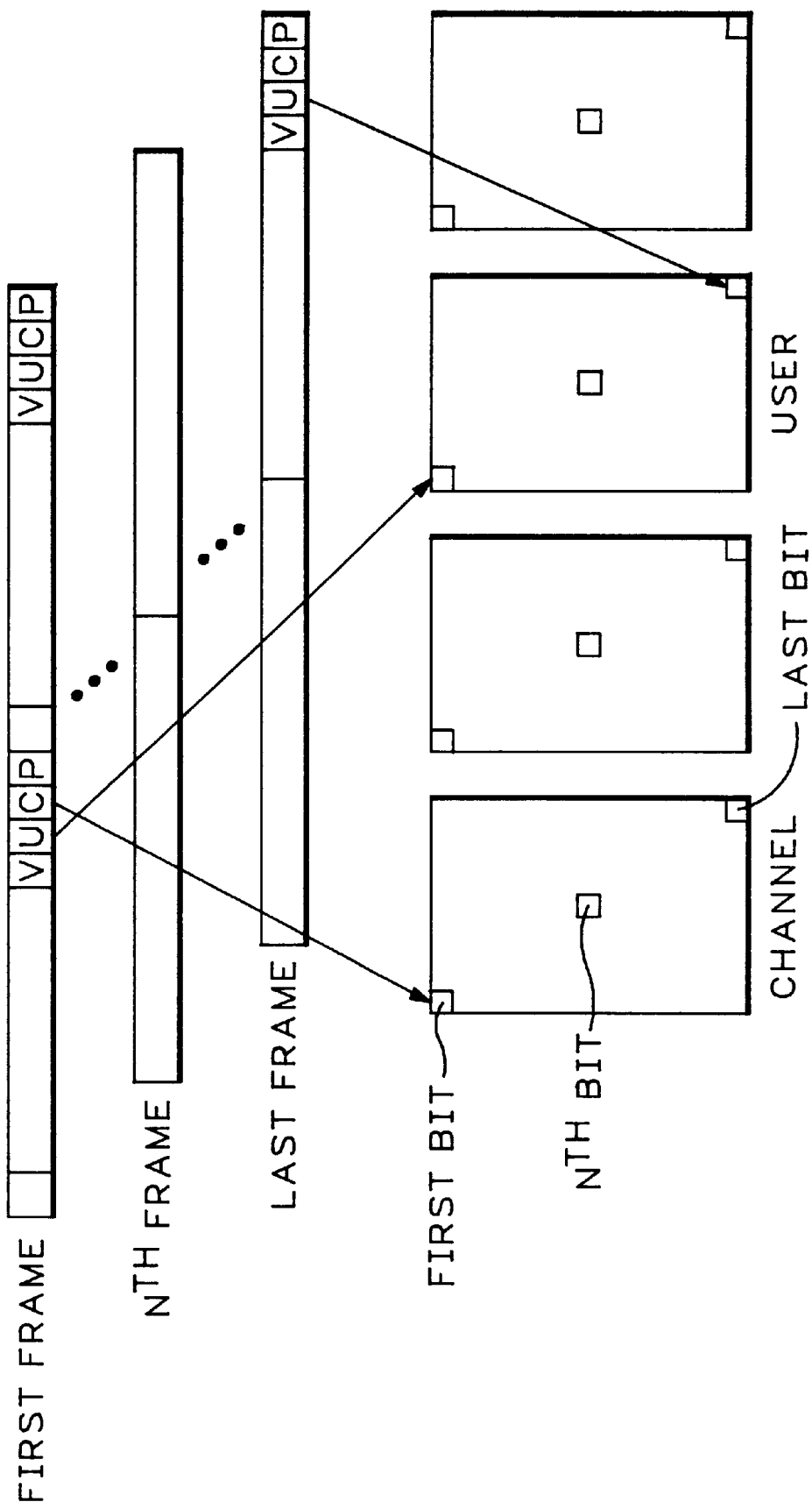
FIG. 4 is an illustration of the formation of ancillary blocks of data from the serial data block of FIG. 2.
Figures 5, 6:
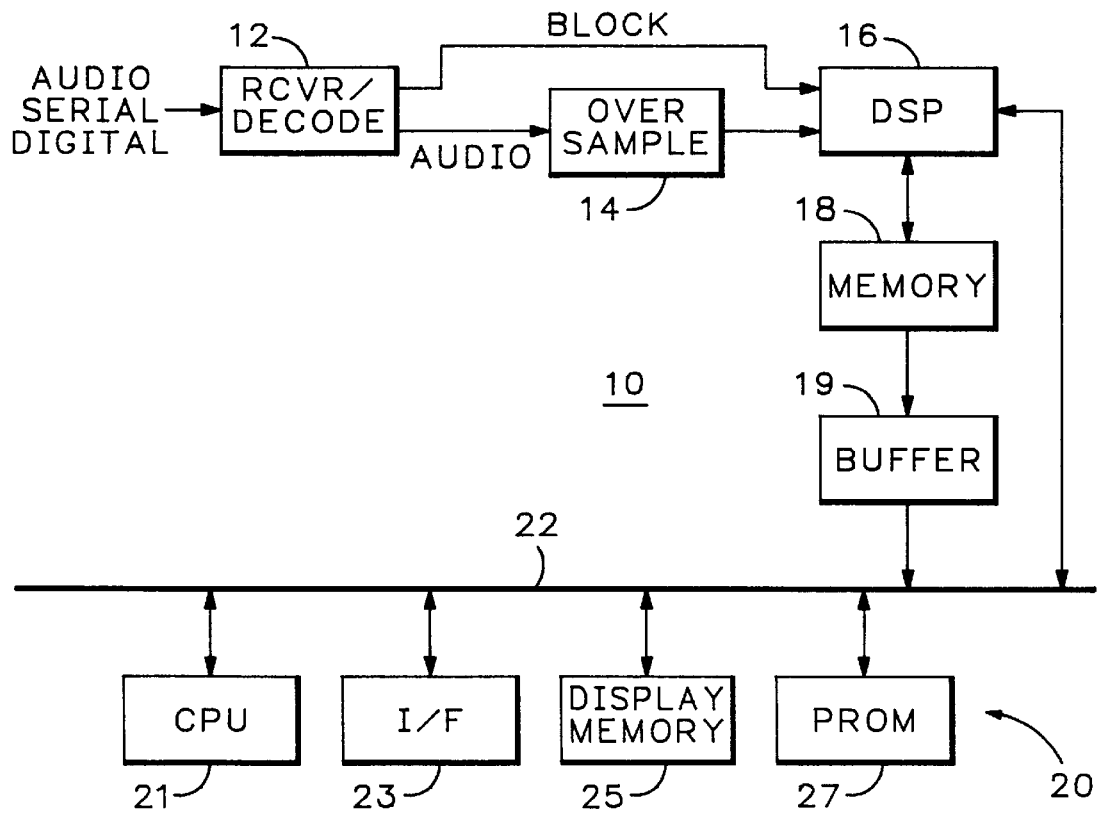
FIG. 5 is an illustration of a display of an ancillary block of data from FIG. 4.
FIG. 6 is a block diagram of an instrument using adaptive cursors for unformatted groups of data bits according to the present invention.

Referring now to FIG. 6 an audio instrument 10 receives an audio serial digital input signal which is input to a receiver/decoder 12. The receiver/decoder 12 extracts the audio data samples from the digital input signal, 24 bits from each subframe with one frame providing either two audio signals or a stereo pair of audio signals in the AES/EBU format. The extracted audio data is input to an oversampler 14 and the oversampled audio data is input to a digital signal processor (DSP) 16. The receiver/decoder 12 also extracts the respective block bits V, U, C, P from each subframe and sends them to the DSP 16. The DSP 16 builds the block bits into the respective ancillary blocks stored in a memory 18 as shown in FIG. 4 so that at the end of an audio serial digital block a complete ancillary block is formed for each of the block bits V, U, C, P.

The DSP 16 communicates with a microprocessor 20 over a bus 22. The microprocessor 20 includes a central processing unit (CPU) 21, an interface (I/F) 23 for communicating with an operator, a display and associated memory circuit 25, and a programmable read only memory (PROM) 27. The I/F 23, display/memory 25 and PROM 27 communicate with the CPU 21 over the bus 22. The ancillary blocks from the memory 18 are transferred to the microprocessor bus 22 via a buffer 19. The microprocessor 20 converts the audio data from the DSP 16 into an analog signal for display by the display 25. The microprocessor 20 also displays the ancillary blocks as selected by an operator via the I/F 23 in binary form or in a decoded form. The format of the ancillary blocks is contained in the PROM 27 and is used by the CPU 21 to decode the binary data in the selected ancillary block. Since the format of the ancillary block data is determined by the status of certain ones of the bits within the block, the PROM 27 contains more than one format for the selected ancillary block with the pointer bits determining which format is used to decode the remaining binary data.

Figures 7, 8:
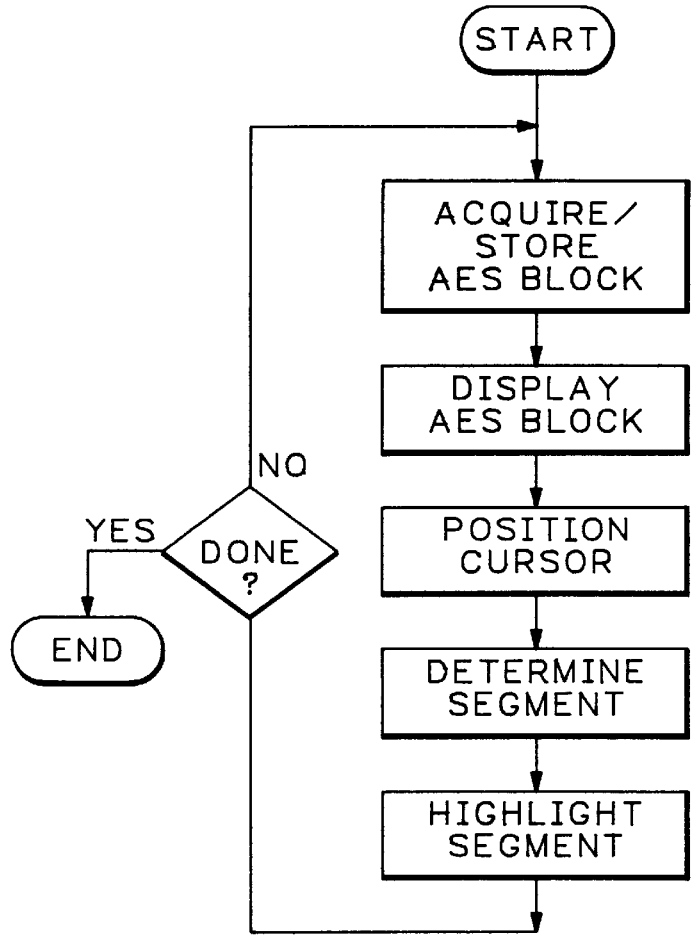
FIG. 7 is an illustration of a display of an ancillary block of data using adaptive cursors according to the present invention.
FIG. 8 is a flow chart diagram for the adaptive cursors according to the present invention.

As shown in FIG. 7 the ancillary block may be displayed in binary form, as in FIG. 5. A cursor 30, controlled by the operator via the I/F 23, may be moved to any point within the binary data. Each bit associated with the bit at the cursor point is highlighted 32. Thus each segment of the selected ancillary block is highlighted in turn as the cursor 30 is positioned within the binary data. If the particular segment is only one bit, such as the identification bit, then only one bit is highlighted. If the particular segment is multiple bits within a word, then only those bits are highlighted. If the particular segment is multiple words, then those words are highlighted. Simultaneously the particular segment is decoded by the microprocessor 20 to provide on the display 25 an alphanumeric indicator of the title and value for the highlighted segment. In this way the operator may observe the binary data within the selected ancillary block while knowing what bits belong to a particular segment and what the value for the segment is.

The microprocessor 20 controls the instrument 10 and commands the DSP 16 to acquire and store the ancillary blocks as shown in FIG. 8. Once the block is complete in memory 18 it is transferred to the buffer 19 so that the next block may be acquired and stored in the memory. The microprocessor 20 displays the selected ancillary block on the display 25 in either binary or decoded form. In the binary form the operator positions the cursor 30 to the desired bit within the block. At each position of the cursor 30 the microprocessor 20 determines from the appropriate format in the PROM 27 what the associated bits are, and highlights all of the bits associated with the cursor position on the display 25. This cycle repeats so long as the display is in the binary mode.

Thus the present invention provides an adaptive cursor for binary data that highlights all of the bits defining a segment associated with a cursor position according to a format stored in a PROM.

What is claimed is:

1. A method of displaying an adaptive cursor for unformatted groups of binary data comprising the steps of:

extracting from a serial digital input signal bits for the unformatted groups of binary data, each group forming an ancillary block of data;

displaying a selected one of the ancillary blocks of data in binary form;

manually positioning a marker cursor at a bit position within the selected ancillary block of data;

determining from a stored format for the selected ancillary block of data the bits associated with the bit position that form a segment within the selected ancillary block of data; and automatically simultaneously highlighting on the display the bits of the segment within the selected ancillary block of data as the adaptive cursor.

2. The method as recited in claim 1 further comprising the steps of:

decoding the segment based upon the stored format; and displaying the decoded segment in an alphanumeric form.

3. The method as recited in claim 1 wherein the stored format is selected from a plurality of stored formats according to the status of certain ones of the bits within the ancillary block of data.

4. A method of displaying an adaptive cursor for unformatted groups of binary data comprising the steps of:

extracting from a serial digital input signal bits for the unformatted groups of binary data as a plurality of ancillary blocks of data;

selecting one of the ancillary blocks of data for display;

displaying the selected one of the ancillary blocks of data in binary form on a display;

manually positioning a marker cursor on the display at a desired bit position within the selected one of the ancillary blocks of data;

selecting from a plurality of stored formats for the selected one of the ancillary blocks of data a decode format for the selected one of the ancillary blocks of data according to the status of certain ones of the bits within the selected one of the ancillary blocks of data;

determining from the decode format bits associated with the desired bit position that form a segment; and automatically simultaneously highlighting on the display the bits of the segment within the selected one of the ancillary blocks of data as the adaptive cursor.

* * * * *